United States Patent
Judd

(10) Patent No.: US 10,841,447 B2
(45) Date of Patent: Nov. 17, 2020

(54) IMAGE FORMING SYSTEM FOR COMMUNICATING WITH MOBILE TERMINAL AND SETTING MODE OF IMAGE FORMING APPARATUS

(71) Applicant: KYOCERA Document Solutions Inc., Osaka (JP)

(72) Inventor: Isaac Judd, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/937,912

(22) Filed: Mar. 28, 2018

(65) Prior Publication Data
US 2018/0288257 A1 Oct. 4, 2018

(30) Foreign Application Priority Data
Mar. 29, 2017 (JP) ................................ 2017-064638

(51) Int. Cl.
| H04N 1/00 | (2006.01) |
| H04N 1/327 | (2006.01) |
| H04W 4/02 | (2018.01) |

(52) U.S. Cl.
CPC ..... *H04N 1/00779* (2013.01); *H04N 1/00307* (2013.01); *H04N 1/00814* (2013.01);
(Continued)

(58) Field of Classification Search
CPC .......... H04N 1/00994; H04N 1/00307; H04N 2201/0096; G06F 3/1292; H04W 4/02–029
See application file for complete search history.

(56) References Cited

U.S. PATENT DOCUMENTS 9,189,189 B2 11/2015 Sato
9,223,272 B2 12/2015 Asaka et al.
(Continued)

FOREIGN PATENT DOCUMENTS

| CN | 104125361 A | 10/2014 |
| JP | 2004304408 A | 10/2004 |
(Continued)

OTHER PUBLICATIONS

An Office Action issued by the China National Intellectual Property dated May 23, 2019, which corresponds to Chinese Patent Application No. 201810267730.6 and is related to U.S. Appl. No. 15/937,912.
(Continued)

*Primary Examiner* — Nicholas Pachol
(74) *Attorney, Agent, or Firm* — Studebaker & Brackett PC

(57) ABSTRACT

An image forming system includes an image forming apparatus and a mobile terminal. The image forming apparatus forms an image on paper. The mobile terminal communicates with the image forming apparatus through a communication network. Mode information is inputted to the image forming apparatus from an external device. The mode information indicates a quiet mode in which an image is formed at a predetermined formation speed, or a normal mode in which the image is formed at a faster formation speed than the quiet mode. The quiet mode is settable on the mobile terminal. The image forming apparatus forms an image in the quiet mode when the mode information inputted from the external device indicates the normal mode and setting information indicating the quiet mode is acquired from the mobile terminal.

3 Claims, 4 Drawing Sheets

(52) U.S. Cl.
CPC .......... *H04N 1/32736* (2013.01); *H04W 4/02* (2013.01); *H04N 1/3276* (2013.01); *H04N 2201/0094* (2013.01)

(56) References Cited

U.S. PATENT DOCUMENTS

| | | | |
|---|---|---|---|
| 9,319,833 B1* | 4/2016 | Greenspan | H04W 4/029 |
| 2003/0164987 A1* | 9/2003 | Enomoto | H04N 1/00204 358/400 |
| 2003/0164988 A1* | 9/2003 | Enomoto | H04N 1/00204 358/400 |
| 2003/0184796 A1* | 10/2003 | Kokubo | H04N 1/00204 358/1.15 |
| 2003/0187958 A1* | 10/2003 | Aoki | H04N 1/00214 709/219 |
| 2003/0187965 A1* | 10/2003 | Enomoto | H04N 1/00204 709/221 |
| 2003/0236713 A1* | 12/2003 | Kuwabara | G06Q 10/087 705/26.1 |
| 2012/0128386 A1 | 5/2012 | Katayama et al. | |
| 2014/0321876 A1 | 10/2014 | Asaka et al. | |
| 2015/0061217 A1* | 3/2015 | Minakuchi | B65H 3/44 271/258.01 |
| 2015/0079962 A1* | 3/2015 | Baker | H04W 8/18 455/418 |
| 2015/0116753 A1 | 4/2015 | Sato | |
| 2016/0255234 A1* | 9/2016 | Nishihara | H04N 1/00994 358/1.13 |
| 2016/0358048 A1* | 12/2016 | Sasami | G03G 15/652 |
| 2017/0257735 A1* | 9/2017 | Kaplan | H04W 4/023 |

FOREIGN PATENT DOCUMENTS

| | | |
|---|---|---|
| JP | 2006-103095 A | 4/2006 |
| JP | 2010132400 A | 6/2010 |
| JP | 2012108365 A | 6/2012 |
| JP | 2013053867 A | 3/2013 |
| JP | 2015084126 A | 4/2015 |
| JP | 2015106266 A | 6/2015 |
| JP | 2015119246 A | 6/2015 |

OTHER PUBLICATIONS

An Office Action mailed by the Japanese Patent Office dated Nov. 5, 2019, which corresponds to Japanese Patent Application No. 2017-064638 and is related to U.S. Appl. No. 15/937,912.

* cited by examiner

IMAGE FORMING SYSTEM FOR COMMUNICATING WITH MOBILE TERMINAL AND SETTING MODE OF IMAGE FORMING APPARATUS

INCORPORATION BY REFERENCE

The present application claims priority under 35 U.S.C. § 119 to Japanese Patent Application No. 2017-064638, filed on Mar. 29, 2017, The contents of this application are incorporated herein by reference in their entirety.

BACKGROUND

The present disclosure relates to an image forming system.

An image forming apparatus includes a printing function and a telephone function. The printing function is executed in a normal mode in which printing speed takes priority, or a quiet mode in which the printing speed is reduced to less than the normal mode. In the image forming apparatus, the normal mode is switched to the quiet mode when the telephone function receives a call during execution of the printing function in the normal mode. As a result, a pleasant phone conversation can be conducted during the execution of the printing function.

SUMMARY

An image forming system according to the present disclosure includes an image forming apparatus and a mobile terminal. The image forming apparatus forms an image on a recording medium. The mobile terminal communicates with the image forming apparatus through a communication network. Mode information is inputted to the image forming apparatus from an external device. The mode information indicates a quiet mode in which the image is formed at a predetermined formation speed, or a normal mode in which the image is formed at a faster formation speed than the quiet mode. The quiet mode is settable on the mobile terminal. The image forming apparatus forms the image in the quiet mode when the mode information inputted from the external device indicates the normal mode and setting information indicating the quiet mode is acquired from the mobile terminal.

DETAILED DESCRIPTION

Figure 1:
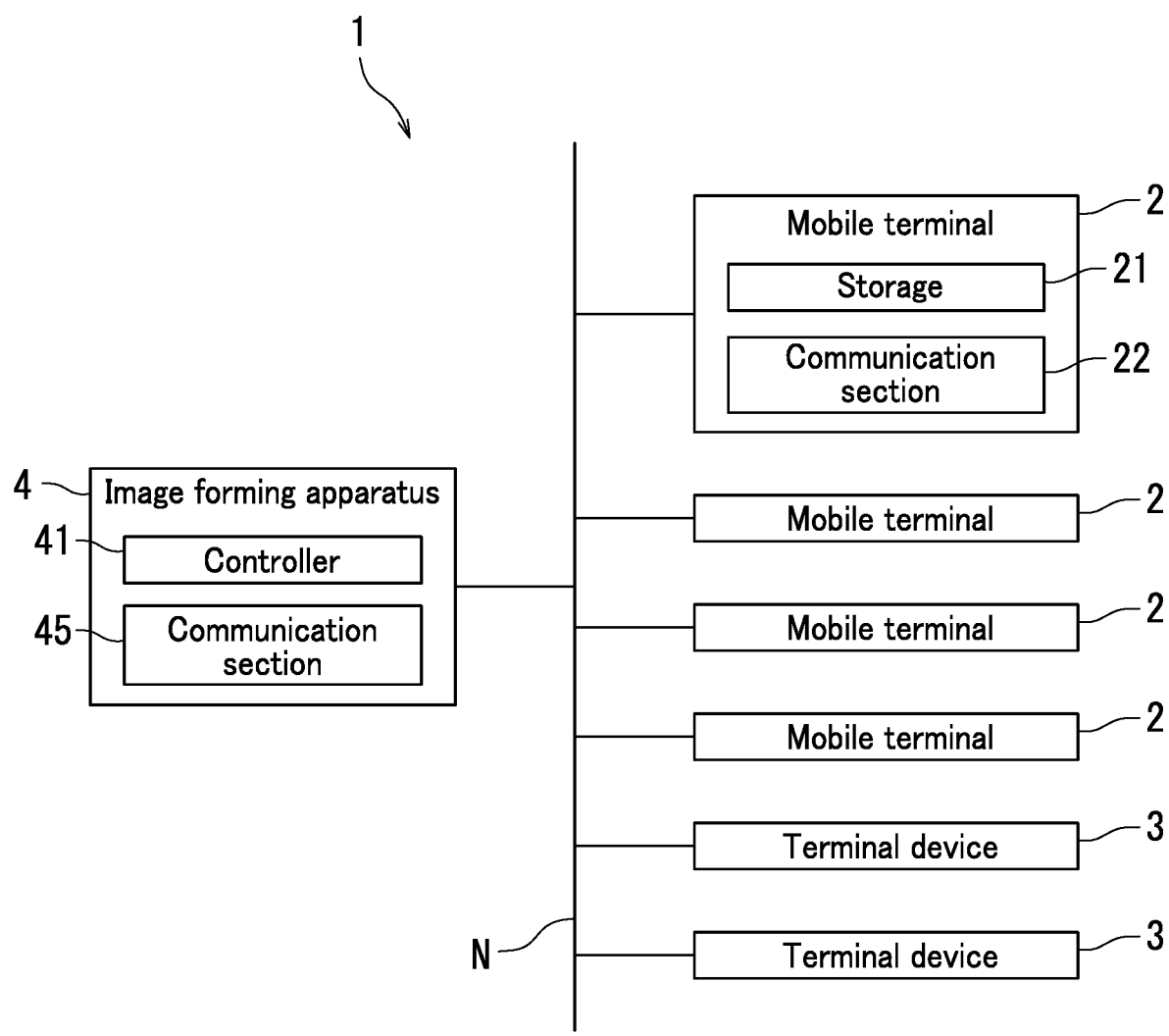
FIG. 1 is a block diagram illustrating an image forming system according to a first embodiment of the present disclosure.

Embodiments of the present disclosure will be described as follows with reference to the drawings. However, the present disclosure is not limited to the following embodiments. It should be noted that elements in the drawings that are the same or equivalent are labelled using the same reference signs and description thereof is not repeated.

First Embodiment

An image forming system 1 according to a first embodiment of the present disclosure will be described with reference to FIG. 1. FIG. 1 is a block diagram illustrating the image forming system 1 according to the first embodiment of the present disclosure. As illustrated in FIG. 1, the image forming system 1 includes a plurality of mobile terminals 2, a plurality of terminal devices 3, and an image forming apparatus 4.

The image forming apparatus 4 is a multifunction peripheral. A multifunction peripheral includes at least two of the following functions, for example: a copy function, a printing function, and a facsimile function. The image forming apparatus 4 forms an image on later-described paper S. The image forming apparatus 4 forms an image on the paper S at a predetermined formation speed in a quiet mode. The image forming apparatus 4 forms an image on the paper S at a formation speed that is faster than the quiet mode in a normal mode.

The image forming apparatus 4 includes a controller 41 and a communication section 45. The controller 41 directs the communication section 45 to communicate with each of the mobile terminals 2 and each of the terminal devices 3 through a communication network N.

The communication network N is the Internet or a dedicated link such as wireless communication, for example. An example of the wireless communication is BLUETOOTH (registered Japanese trademark). The wireless communication also includes optical communication. In the optical communication, each of the mobile terminals 2 and the image forming apparatus 4 perform communication using light.

A mobile terminal 2 is carried by a carrier who is a person in proximity to the image forming apparatus 4 including a user of the image forming apparatus 4, for example. The mobile terminal 2 is a mobile phone such as a smartphone, a tablet personal computer, or a notebook personal computer, for example. The mobile terminal 2 is communicatively connected to the image forming apparatus 4 through the communication network N.

The mobile terminal 2 includes storage 21, a communication section 22, a mobile display section, and a mobile operation section. The communication section 22 can communicate with the image forming apparatus 4 through the communication network N.

The quiet mode can be set on the mobile terminal 2. The mobile display section displays various screens to the carrier. The mobile operation section generates an operation signal according to an operation of the carrier. The quiet mode set by the carrier is stored in the storage 21.

The carrier, for example, acquires a setting screen of the image forming apparatus 4 through the communication network N for setting the quiet mode on the mobile terminal 2. The carrier inputs information indicating the quiet mode from the mobile operation section according to the setting screen displayed by the mobile display section. The storage 21 stores setting information generated based on the operation signal from the mobile operation section. The setting information includes information indicating whether or not the quiet mode is set.

A terminal device 3 outputs mode information to the image forming apparatus 4 according to an operation of the user of the image forming apparatus 4. The terminal device 3 is an example of an external device according to an aspect of the present disclosure. The terminal device 3 is a desktop personal computer, a notebook personal computer, a tablet personal computer, a facsimile machine, or a camera, for example.

The mode information indicates the normal mode or the quiet mode. The mode information is outputted to the image forming apparatus 4 with image data, for example. The image data indicates an image of an original document.

Figure 2:
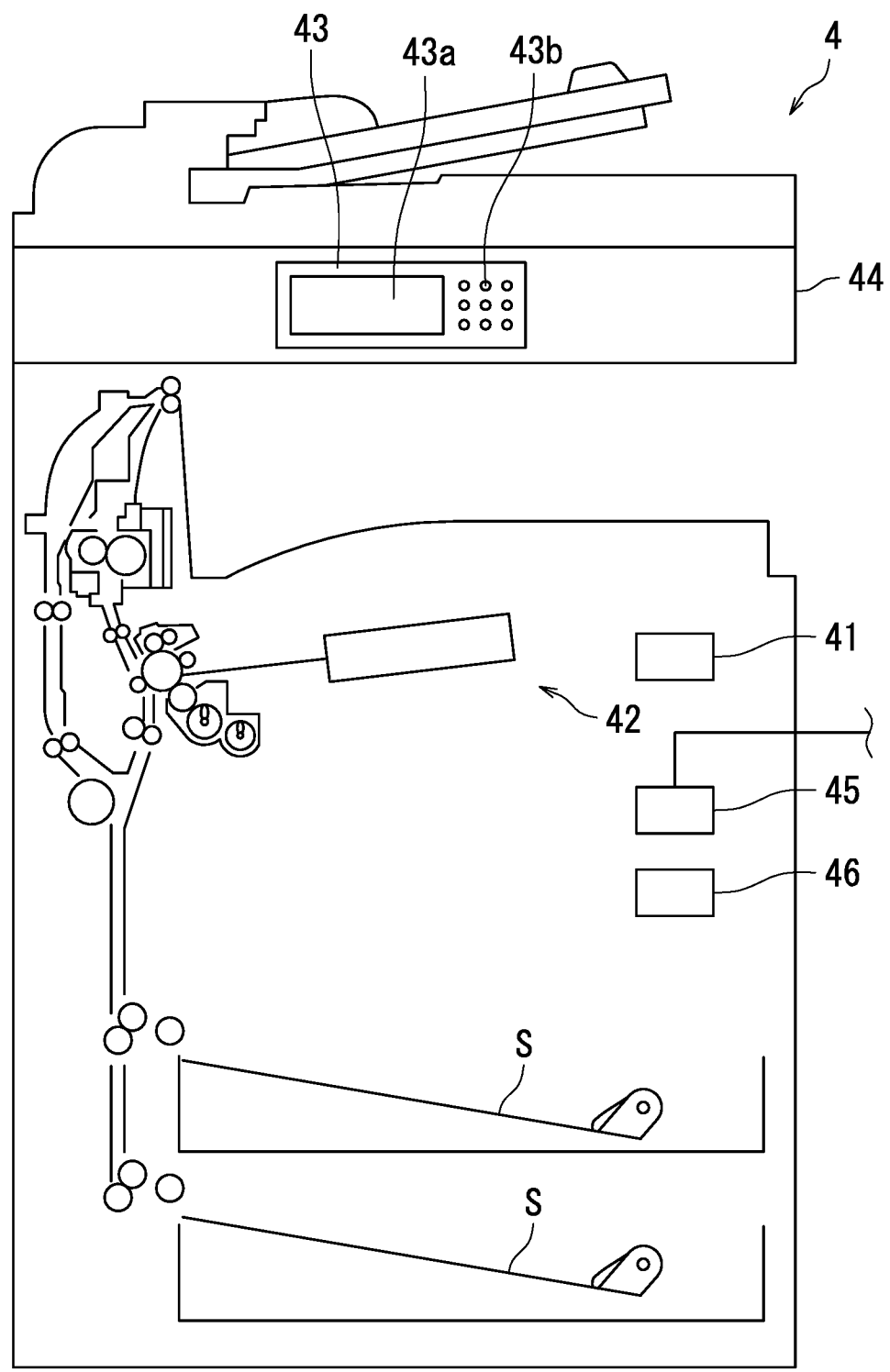
FIG. 2 is a diagram illustrating a configuration of an image forming apparatus from FIG. 1.

The image forming apparatus 4 will be described with reference to FIG. 2. FIG. 2 illustrates a configuration of the image forming apparatus 4. As illustrated in FIG. 2, the image forming apparatus 4 further includes an image forming section 42, an operation panel 43, an image reading section 44, and storage 46 in addition to the controller 41 and the communication section 45.

The controller 41 can set the image forming apparatus 4 to the quiet mode or the normal mode. The formation speed in the quiet mode is slower than the formation speed in the normal mode. As a result, operation noise of the image forming apparatus 4 is suppressed as compared to the normal mode. By contrast, the formation speed in the normal mode is faster than the formation speed in the quiet mode. As a result, the time required to form an image on the paper S is reduced as compared to the quiet mode.

The paper S is an example of a recording medium. The paper S is plain paper, copy paper, recycled paper, thin paper, thick paper, glossy paper, or overhead projector (OHP) transparency, for example.

The image forming section 42 forms a toner image on the paper S based on the image data. The image forming section 42 forms the toner image on the paper S at the formation speed of the normal mode or the quiet mode.

The image reading section 44 reads the original document and generates image data. The image reading section 44 outputs the image data to the controller 41. The image reading section 44 is a scanner, for example.

The operation panel 43 includes a display section 43a and an operation section 43b. The operation section 43b includes hard keys. The operation section 43b outputs an operation signal according to an operation of the user of the image forming apparatus 4. The operation of the user includes an operation to perform various settings of the image forming apparatus 4, for example.

The display section 43a includes a display. The display includes a touch panel function. The display section 43a displays various screens to the user of the image forming apparatus 4. The display section 43a also displays an operation screen showing input keys and the like, and functions as the operation section 43b.

Figure 3:
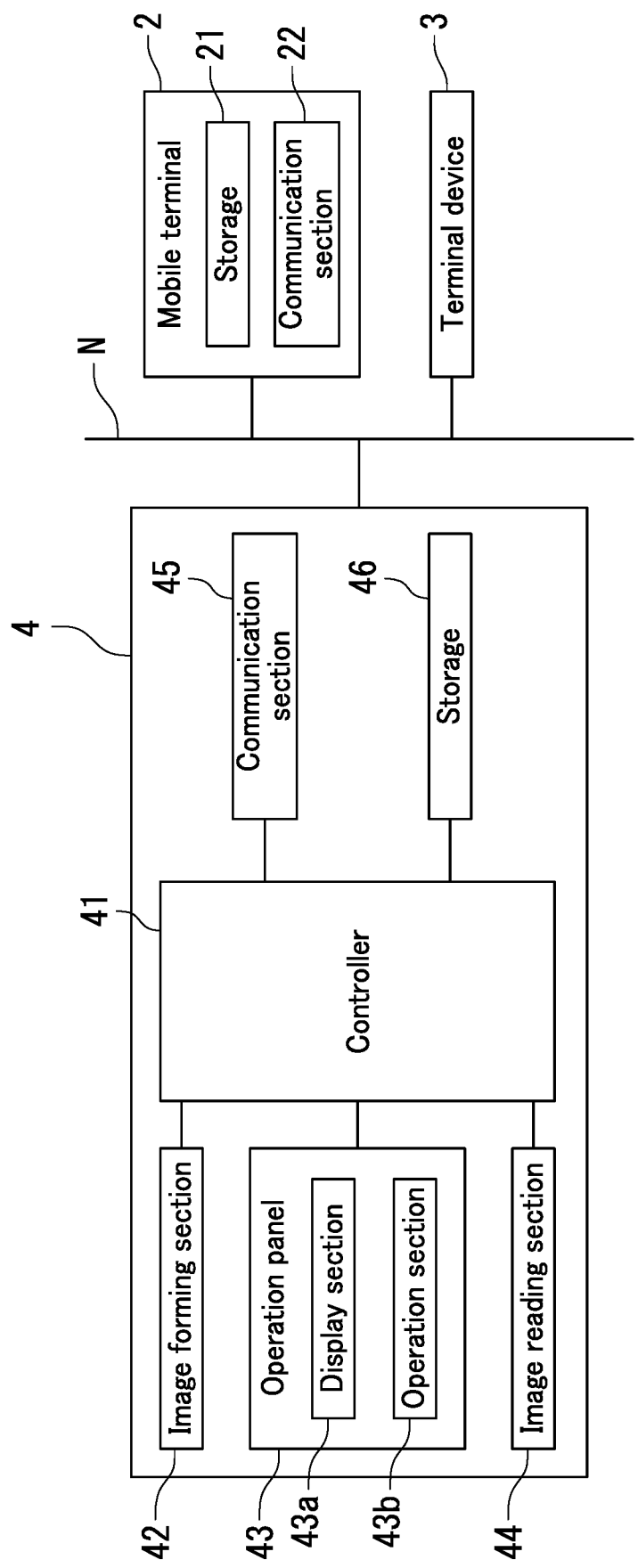
FIG. 3 is a block diagram illustrating the configuration of the image forming apparatus from FIG. 2.

The controller 41 will be further described with reference to FIG. 3. FIG. 3 is a block diagram illustrating a configuration of the image forming apparatus 4 of the first embodiment. The storage 46 includes semiconductor memory such as read-only memory (ROM) or random-access memory (RAM). The ROM, for example, stores various computer programs to be executed by the controller 41. The RAM, for example, stores image data and the setting information of the mobile terminal 2.

The controller 41 controls the image forming section 42, the operation panel 43, and the image reading section 44 by executing computer programs pre-stored in the storage 46. The controller 41 includes a central processing unit (CPU), for example.

The controller 41 directs the image forming section 42 to form the toner image on the paper S based on image data inputted from the terminal device 3. Note that the image data may be inputted from a camera using a USB function or a wireless function, for example. The mode information is inputted from the operation panel 43, for example, when using a camera.

The controller 41 sets the mode of the image forming apparatus 4 based on the mode information inputted from a terminal device 3 and the setting information of a mobile terminal 2.

The controller 41 acquires the setting information from the mobile terminal 2 based on communication with the mobile terminal 2. The controller 41 directs the communication section 45 to acquire the setting information from the storage 21 of the mobile terminal 2. As a result, the controller 41 acquires the setting information from the communication section 22 of the mobile terminal 2 through the communication section 45.

The controller 41 stores the acquired setting information of the mobile terminal 2 in the storage 46. The controller 41 stores the setting information of the mobile terminal 2, for example, in the storage 46 in association with individual information of the mobile terminal 2. The controller 41, for example, acquires the setting information from the mobile terminal 2 when image data is inputted to the image forming apparatus 4. Note that the controller 41 may acquire the setting information from the mobile terminal 2 at a predetermined interval.

The controller 41 determines whether or not the mode information indicates the normal mode when the image data and the mode information are inputted to the image forming apparatus 4. The controller 41 sets the image forming apparatus 4 to the quiet mode when the mode information indicates the quiet mode instead of the normal mode. As a result, the image forming apparatus 4 forms an image on the paper S at the formation speed of the quiet mode.

The controller 41 refers to the setting information of the mobile terminal 2 stored in the storage 46 when the mode information indicates the normal mode. The controller 41 determines whether or not the setting information includes information that indicates the quiet mode. The controller 41 sets the image forming apparatus 4 to the normal mode when the setting information does not include information indicating the quiet mode. As a result, the image forming apparatus 4 forms an image on the paper S at the formation speed of the normal mode.

The controller 41 sets the image forming apparatus 4 to the quiet mode when the setting information includes information that indicates the quiet mode. As a result, the image forming apparatus 4 forms an image on the paper S at the formation speed of the quiet mode.

In the image forming system 1 according to the first embodiment of the present disclosure, an image is formed on the paper S at the formation speed of the quiet mode so as to correspond with the setting of the carrier carrying the mobile terminal 2 even when the mode information indicating the normal mode has been inputted to the image forming apparatus 4 from the user of the image forming apparatus 4 through the terminal device 3. That is, the mode of the image forming apparatus 4 is set so as to correspond with the quiet mode set by the carrier from the mobile terminal 2 in the first embodiment of the present disclosure. As a result, the image forming system 1 according to the first embodiment of the present disclosure can prevent discomfort to a person in proximity to the image forming apparatus 4 due to the operation noise of the image forming apparatus 4. The person in proximity to the image forming apparatus 4, for example, is a person located near the image forming apparatus 4 and a person who is sensitive to noise.

Second Embodiment

Continuing, the image forming system 1 according to a second embodiment of the present disclosure will be described with reference to FIG. 3. In the first embodiment of the present disclosure, the image forming apparatus 4 is set to the quiet mode based on the setting information of a mobile terminal 2. In the second embodiment of the present disclosure however, the mode of the image forming apparatus 4 is set based on setting information and location information of a mobile terminal 2.

The controller 41 generates the location information of the mobile terminal 2 based on communication with the mobile terminal 2. Specifically, the controller 41 measures the distance between the image forming apparatus 4 and the mobile terminal 2 based on wireless communication time with the mobile terminal 2. The controller 41 generates the location information of the mobile terminal 2 based on the measured distance.

The controller 41 stores the generated location information in the storage 46. The controller 41, for example, stores the setting information and the location information of the mobile terminal 2 in the storage 46 in association with the individual information of the mobile terminal 2. The controller 41 generates the location information of the mobile terminal 2 when image data is inputted to the image forming apparatus 4. Note that the controller 41 may generate the location information of the mobile terminal 2 at a predetermined interval.

The controller 41 determines whether or not the mode information indicates the normal mode when image data and the mode information are inputted to the image forming apparatus 4. The controller 41 sets the image forming apparatus 4 to the quiet mode when the mode information indicates the quiet mode instead of the normal mode. As a result, the image forming apparatus 4 forms an image on the paper S at the formation speed of the quiet mode.

The controller 41 determines whether or not the setting information indicating that the mobile terminal 2 within a predetermined range of the image forming apparatus 4 is set to the quiet mode is stored in the storage 46 when the mode information indicates the normal mode. Specifically, the controller 41 refers to the location information stored in the storage 46 and determines whether or not the mobile terminal 2 is located within the predetermined range of the image forming apparatus 4. The controller 41 sets the image forming apparatus 4 to the normal mode when the mobile terminal 2 is not located within the predetermined range. As a result, the image forming apparatus 4 generates an image on the paper S at the formation speed of the normal mode.

The controller 41 refers to the setting information of the mobile terminal 2 within the predetermined range stored in the storage 46 when the mobile terminal 2 is located within the predetermined range. The controller 41 determines whether or not the setting information of the mobile terminal 2 within the predetermined range indicates a setting to the quiet mode. The controller 41 sets the image forming apparatus 4 to the normal mode when the setting information does not indicate a setting to the quiet mode. As a result, the image forming apparatus 4 forms an image on the paper S at the formation speed of the normal mode.

The controller 41 sets the image forming apparatus 4 to the quiet mode when the setting information indicates a setting to the quiet mode. As a result, the image forming apparatus 4 forms an image on the paper S at the formation speed of the quiet mode.

In the image forming system 1 according to the second embodiment of the present disclosure, an image is formed on the paper S at the formation speed of the quiet mode so as to correspond with the setting of the carrier located within a predetermined range of the image forming apparatus 4 even when the mode information indicating the normal mode is inputted to the image forming apparatus 4 from the user of the image forming apparatus 4 through a terminal device 3. That is, the mode of the image forming apparatus 4 is set so as to correspond with the quiet mode set by the mobile terminal 2 located near the image forming apparatus 4 in the second embodiment. As a result, discomfort to the carrier located near the image forming apparatus 4 due to the operation noise of the image forming apparatus 4 can be prevented in the image forming system 1 according to the second embodiment of the present disclosure.

Note that the controller 41 may notify the terminal device 3 that the image forming apparatus 4 has been set to the quiet mode when the mode information inputted from the user through the terminal device 3 indicates the normal mode but the image forming apparatus 4 has been set to the quiet mode. As a result, the user who has inputted the mode information indicating the normal mode to the image forming apparatus 4 can confirm in advance that the image forming apparatus 4 will form an image on the paper S in the quiet mode so as to correspond with the setting of the carrier located near the image forming apparatus 4.

Figure 4:
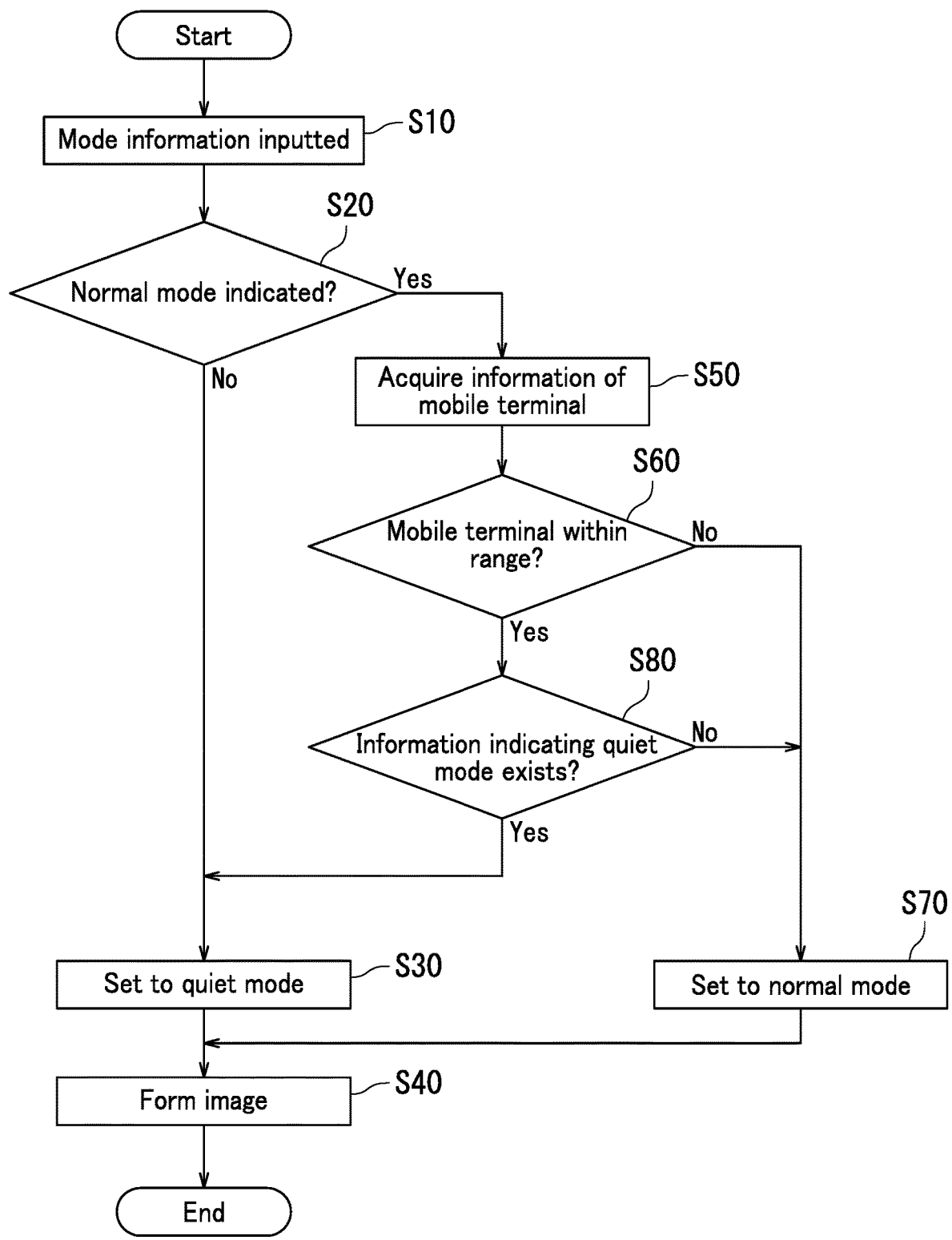
FIG. 4 is a flowchart illustrating image formation control of a controller according to a second embodiment of the present disclosure.

Image formation control performed by the controller 41 according to the second embodiment of the present disclosure will be described with reference to FIG. 4. FIG. 4 is a flowchart illustrating the image formation control of the controller 41. In Step S10 as illustrated in FIG. 4, image data and mode information are inputted to the controller 41 from the terminal device 3. In Step S20, the controller 41 determines whether or not the mode information indicates the normal mode. When the mode information does not indicate the normal mode (No in Step S20), the controller 41 sets the image forming apparatus 4 to the quiet mode in Step S30. In Step S40, the controller 41 directs the image forming section 42 to form an image on the paper S after the image forming apparatus 4 has been set to the quiet mode, and the image formation control ends.

When the mode information indicates the normal mode (Yes in Step S20), the controller 41 acquires setting information from the mobile terminal 2 and generates the location information of the mobile terminal 2 based on communication with the mobile terminal 2 in Step S50. In Step S60, the controller 41 determines whether or not the mobile terminal 2 is located within a predetermined range of the image forming apparatus 4 based on the location information of the mobile terminal 2 after the setting information of the mobile terminal 2 has been acquired and the location information of the mobile terminal 2 has been generated. When the mobile terminal 2 is not located within the predetermined range (No is Step S60), the controller 41 sets the image forming apparatus 4 to the normal mode in Step S70. In Step S40, the controller 41 directs the image forming section 42 to form an image on the paper S after the image forming apparatus 4 has been set to the normal mode, and the image formation control ends.

When the mobile terminal 2 is located within the predetermined range (Yes in Step S60), the controller 41 determines whether or not the setting information includes information indicating the quiet mode in Step S80. When the setting information includes information that indicates the quiet mode (Yes in Step S80), the controller 41 sets the image forming apparatus 4 to the quiet mode in Step S30. In Step S40, the controller 41 directs the image forming section 42 to form an image on the paper S after the image forming apparatus 4 has been set to the quiet mode, and the image formation control ends.

Note that when the setting information does not include information indicating the quiet mode (No in Step S80), the controller 41 sets the image forming apparatus 4 to the normal mode in Step S70. In Step S40, the controller 41 directs the image forming section 42 to form an image on the paper S after the image forming apparatus 4 has been set to the normal mode, and the image formation control ends.

The image forming system 1 according to the first and second embodiments of the present disclosure is described above with reference to FIGS. 1 to 4. However, the present disclosure is not limited to the first and second embodiments, and may be practiced in various forms without deviating from the essence thereof.

In the second embodiment of the present disclosure for example, the controller 41 refers to the setting information of the mobile terminal 2 located within the predetermined range of the image forming apparatus 4. However, the present disclosure is not limited hereto. The controller 41 of the present disclosure need only acquire the setting information from a mobile terminal 2 carried by a certain carrier. For example, the controller 41 may acquire the setting information from the mobile terminal 2 carried by a carrier located nearest to the image forming apparatus 4, among a plurality of mobile terminals 2. Accordingly, the mode of the image forming apparatus 4 is set so as to correspond with the setting of the carrier located nearest to the image forming apparatus 4. As a result, discomfort to the carrier located nearest to the image forming apparatus 4 due to the operation noise of the image forming apparatus 4 can be prevented.

Alternatively, the controller 41 may refer to the setting information of a predetermined mobile terminal 2, for example. As a result, the mode of the image forming apparatus 4 is set so as to correspond with the setting of a certain carrier who is sensitive to the operation noise of the image forming apparatus 4, for example, and discomfort to the carrier due to the operation noise of the image forming apparatus 4 can be prevented.

For another example, the controller 41 generates the location information of the mobile terminal 2 based on communication time with the mobile terminal 2 according to the second embodiment of the present disclosure. However, the present disclosure is not limited hereto. The controller 41 need only generate the location information of the mobile terminal 2. The controller 41 includes a GPS function, for example. The controller 41 can generate a location of the image forming apparatus 4 using the GPS function. The mobile terminal 2 also includes a GPS function, for example. The mobile terminal 2 can generate a location of the mobile terminal 2 using the GPS function. The controller 41 may acquire the location of the mobile terminal 2 through the communication network N and generate the location information of the mobile terminal 2 based on the locations of the mobile terminal 2 and the image forming apparatus 4.

For another example, the image forming apparatus 4 refers to the image data and the mode information inputted through the terminal device 3 according to the first and second embodiments of the present disclosure. However, the present disclosure is not limited hereto. The image forming apparatus 4 of the present disclosure need only refer to the inputted mode information. The image forming apparatus 4 may refer to image data inputted through the image reading section 44 and mode information inputted through the operation panel 43, for example.

For another example, the controller 41 acquires the setting information stored in the storage 21 of the mobile terminal 2 according to the first and second embodiments of the present disclosure. However, the present disclosure is not limited hereto. The controller 41 of the present disclosure need only acquire the setting information indicating the quiet mode from the mobile terminal 2. The controller 41 may acquire the setting information indicating the quiet mode from the mobile terminal 2 when the mobile terminal 2 is in a vibrate mode, for example. As a result, the work of the carrier inputting information indicating the quiet mode to the mobile terminal 2 can decrease, and convenience of the image forming system 1 can increase. Note that the mobile terminal 2 can be set to the vibrate mode. The mobile terminal 2 suppresses alert sounds in the vibrate mode.

It should be noted that the drawings schematically illustrate elements of configuration in order to facilitate understanding, and properties of elements of configuration illustrated in the drawings, such as thickness and length thereof, may differ from actual properties thereof in order to facilitate preparation of the drawings. Furthermore, properties of elements of configuration described in the above embodiments, such as shapes, are merely examples and are not intended as specific limitations. The elements may be altered without substantially deviating from the configuration of the present disclosure.

What is claimed is:

1. An image forming system comprising:
   an image forming apparatus configured to form an image on a recording medium;
   a plurality of mobile terminals configured to communicate with the image forming apparatus through a communication network; and
   a plurality of terminal devices configured to communicate with the image forming apparatus, wherein
   image data and mode information are inputted to the image forming apparatus from one of the terminal devices,
   the mode information indicates a quiet mode in which the image is formed at a predetermined formation speed, or a normal mode in which the image is formed at a faster formation speed than the quiet mode,
   each of the mobile terminals is settable to a vibrate mode in which an alert sound of the mobile terminal is suppressed,
   setting information indicating the quiet mode is set on each of the mobile terminals when the mobile terminal is set to the vibrate mode,
   the image forming apparatus
      generates location information indicating positions of the mobile terminals based on communication between the image forming apparatus and the mobile terminals,
      determines whether the mode information indicates the normal mode or the quiet mode when the mode information and the image data are inputted from the one of the terminal devices,
      sets to the quiet mode and forms the image based on the image data in the quiet mode when determining that the mode information indicates the quiet mode,
      determines whether or not the setting information is acquired from a mobile terminal located nearest to the image forming apparatus when determining that the mode information indicates the normal mode, sets to the quiet mode, forms the image based on the image data in the quiet mode, and notifies the one of the terminal devices that the quiet mode is set when determining that the setting information is acquired from the mobile terminal located nearest to the image forming apparatus, and sets to the normal mode and forms the image based on the image data in the normal mode when determining that the setting information is not acquired from the mobile terminal located nearest to the image forming apparatus, and the image data indicates the image.

2. The image forming system according to claim 1, wherein the communication network includes wireless communication in which the image forming apparatus and the mobile terminals communicate without using a wire, and the image forming apparatus generates the location information based on time of the wireless communication.

3. The image forming system according to claim 1, wherein each of the mobile terminals includes a GPS function that designates the location of the mobile terminal, and the image forming apparatus generates the location information based on the location of each of the mobile terminals acquired through the communication network.

* * * * *